(12) United States Patent
Arai

(10) Patent No.: US 6,371,556 B1
(45) Date of Patent: Apr. 16, 2002

(54) SEAT STRUCTURE FOR VEHICLE

(75) Inventor: Tomiji Arai, Kanagawa-ken (JP)

(73) Assignee: Ikeda Bussan Co., LTD, Kanagawa-ken (JP)

( * ) Notice: Subject to any disclaimer, the term of this patent is extended or adjusted under 35 U.S.C. 154(b) by 57 days.

(21) Appl. No.: 09/590,005

(22) Filed: Jun. 9, 2000

(30) Foreign Application Priority Data

Jun. 16, 1999 (JP) .......................................... P11-170123

(51) Int. Cl.⁷ ................................................. A47C 1/02
(52) U.S. Cl. .................. 297/331; 297/354.13; 297/337; 297/94; 297/383; 297/342; 297/508; 297/283.2; 297/283.3
(58) Field of Search ........................... 297/354.13, 331, 297/337, 94, 383, 342, 108, 283.3, 283.2

(56) References Cited

U.S. PATENT DOCUMENTS 4,273,376 A  6/1981  Duguet et al.

FOREIGN PATENT DOCUMENTS

| EP | 0 911 210 A2 | 4/1999 |
| GB | 2 336 772 A | 11/1999 |

*Primary Examiner*—Carl D. Friedman
*Assistant Examiner*—Dennis L. Dorsey

(74) *Attorney, Agent, or Firm*—Nath & Associates PLLC; Gary M. Nath; Lee C. Heiman

(57) ABSTRACT

A seat cushion is to pivot to be in a horizontal reversed state and it has a back side. A seat back is to pivot to be in a horizontal reversed state and has a reverse side. The reverse side in the horizontal reversed state has a height substantially equal to one of the back side of the seat cushion in the horizontal reversed state. An arm is attached to a lower end of the seat back and supports the lower end of the seat back to be rotated. A roller is fixed to a lower end of the arm and projects outward in a transverse direction of a vehicle body. A slide rail is fixed to a floor and engages with the roller to be slid forward and rearward. A lock mechanism detachably engages with the roller. A back link is connected to an intermediate fulcrum of the seat back above the roller and is connected to one of an intermediate portion of the slide rail and a peripheral member around the portion. A stopper is provided at the lower end of the seat back. The stopper engages with the arm for preventing the arm from rotating. An operating means is for releasing engagement with the stopper and the arm and is provided at an upper part of the seat back. The seat back pivots forward to be in a horizontal reversed state when releasing the lock mechanism and sliding the roller of the seatback rearward. The seat back pivots on the lower end thereof to fall down rearward for a reclining state when releasing engagement with the stopper and the arm.

9 Claims, 5 Drawing Sheets

SEAT STRUCTURE FOR VEHICLE

BACKGROUND OF THE INVENTION

1. Field of the Invention

The present invention relates to a seat structure, and, more particularly, to a seat structure that is adapted to a vehicle.

2. Description of Relevant Art

In general, in a seat for a vehicle, due to a rest and a sound sleep or spaciously making use of a luggage room, it is known that a flat structure which makes a seat cushion and a seat back approximately the same height and horizontal with each other (refer to Japanese Patent Application Laid-Open Publication After Examination No. 7-27239 as a similar art).

This kind of flat structure has a seat cushion and a seat back which each rotate to be in a horizontal reversed state. At reversing, a back face of the seat cushion and a reverse side of the seat back are approximately flush with each other.

SUMMRY OF THE INVENTION

Inventors have developed a seat back as follows. A roller provided in a lower end of the seat back engages with a slide rail and an intermediate fulcrum of the seat back is connected to the slide rail or its circumferential member by a back link, so that the seat back is reversed there without a large change of front and rear positions. The roller engages with a lock mechanism, and a normal use state of the seat back is maintained. Then, when the lock mechanism is released, and the roller is slid rearward, the seat back rotates forward, and a horizontal reversed-state is obtained.

However, the seat back can be reversed there, while making use of the roller, the back link, and the lock mechanism. These structures are used only for reversing, and can not be used for another ways. Therefore, for example, an exclusive reclining mechanism is necessary for obtaining a reclining state where a seat back with a flattening structure falls down rearward, and a supporting structure of the seat back is complicated. If a lower end of a seat back is simply rotatably supported without an exclusive reclining mechanism, its rotating fulcrum is fixed at a normal time, and its fixing state is released at a reclining time, the seat back is forcibly fallen down on a back side thereof by its weight at the releasing time, so that operability aspect has a problem.

The present invention has been achieved in view of the conventional art with such points.

It is an object of the present invention to provide a flattening seat structure for a vehicle which has no problem that a seat back is forcibly fallen down to a back side thereof when releasing a fixing state though having a simple structure to rotatably support a lower end of the seatback.

To achieve the object, a first aspect of the invention provides a flattening seat structure for a vehicle which has features as follows. A seat cushion is to pivot to be in a horizontal reversed state and has a back side. A seat back is to pivot to be in a horizontal reversed state and has a reverse side. The reverse side in the horizontal reversed state has a height substantially equal to one of the back side of the seat cushion in the horizontal reversed state. An arm is attached to a lower end of the seat back and supports the lower end of the seat back to be rotated. A roller is fixed to a lower end of the arm and projects outward in a transverse direction of a vehicle body. A slide rail is fixed to a floor and engages with the roller to be slid forward and rearward. A lock mechanism detachably engages with the roller. A back link is connected to an intermediate fulcrum of the seat back above the roller and is connected to one of an intermediate portion of the slide rail and a peripheral member around the portion. A stopper is provided at the lower end of the seat back. The stopper engages with the arm for preventing the arm from rotating. An operating means is for releasing engagement with the stopper and the arm and is provided at an upper part of the seat back. The seat back pivots forward to be in a horizontal reversed state when releasing the lock mechanism and sliding the roller of the seatback rearward. The seat back pivots on the lower end thereof to fall down rearward for a reclining state when releasing engagement with the stopper and the arm.

Preferably, the operating means is at the upper part of the seat back and at the reverse side of the seat back.

Preferably, an upper edge of the arm has an arc shape and is formed with a first notch and a second notch. An end of the stopper is supported by the seat back and another end thereof is formed with a projection directed toward the arm. The projection engages with the first notch in normal usage state of the seat back. The projection engages with the second notch in a position slightly displaced from the normal usage state toward the reclining state.

Preferably, the seat cushion in a normal usage state pivots forward on a front-end fulcrum thereof to be in a horizontal reversed state.

Preferably, the peripheral member has a bracket standing in the vicinity of the slide rail, and the bracket supports an end part of the back link to be pivoted thereon.

According to the invention, the operating means is provided at the upper part of the seat back, and when releasing the stopper and the arm, a hand holds the upper part of the seat back, thus preventing the seat back from falling down rearward with great force. Therefore, in a flatting seat structure, though the seat back is supported to pivot by a simple structure, operability is reliable while reclining.

The operating means is provided at the upper part of the seat back, and the seat back which is falling down rearward is securely supported from the reverse side in operating for releasing, comparing to providing the operating means at a top part of the seat back or a surface thereof. Therefore, the seat back is further sufficiently prevented from falling down rearward with great force.

The second notch is formed in a position slightly displaced from the normal usage state toward the reclining state, and if a hand is detached from the operating means immediately after releasing engagement, the projection of the stopper engages with the second notch halfway, thus to prevent the seat back from falling down to a reclining position with great force.

As a reversed structure of the seat back, the seat back is simply pivoted forward on the front-end fulcrum, and a structure is simple and reversing operation is easy.

An end part of the back link is supported to pivot by the bracket which stands in the vicinity of the slide rail, and manufacturing the slide rail is not necessary for supporting the end part of the back link. Therefore, production of the slide rail is easy and stiffness of the slide rail is prevented from reducing.

A second aspect of the invention provides a seat for a vehicle which has features as follows. There is provided with a guide member. A seat cushion has a first end and a second end. The first end is supported to pivot by the guide member. The seat cushion is to pivot on the first end to be in a first reversed state. A link member has a third end and a fourth end. The third end is supported to pivot by the guide member. A seat back has a fifth end and a sixth end. The fifth end is adjacent to the second end of the seat cushion. The seat back is connected to the fourth end of the link member and is to slide along the guide member at the fifth end thereof to pivot on the fifth end for a second reversed state. The sixth end of the seat back in the second reversed state is approximately flush with the first end of the seat cushion in the first reversed state.

The "a guide member" includes a slide rail and a peripheral member around the slide rail.

Preferably, the seat back has a roller at the fifth end thereof and the roller engages with the guide member for rotating.

Preferably, the seat further has a lock member which is supported to pivot by the guide member and is to latch with the roller to fix the seat back relative to the guide member.

Preferably, the seat back has a seat back body. The seat back has an angle adjusting mechanism for inclining a seat back body at an angle relative to the seat cushion.

Preferably, the seat back body has a seventh end. The angle adjusting mechanism has an arm for supporting the seventh end to be pivoted. The angle adjusting member has a stopper. The stopper is supported to pivot by the seat back body for detachably latching with the arm.

BRIEF DESCRIPTION OF THE ACCOMPANYING DRAWINGS

These and other features, aspects, and advantages of the present invention will become better understood with regard to the following description, appended claims, and accompanying drawings where:

DESCRIPTION OF THE PREFERRED EMBODIMENTS

Figure 6:
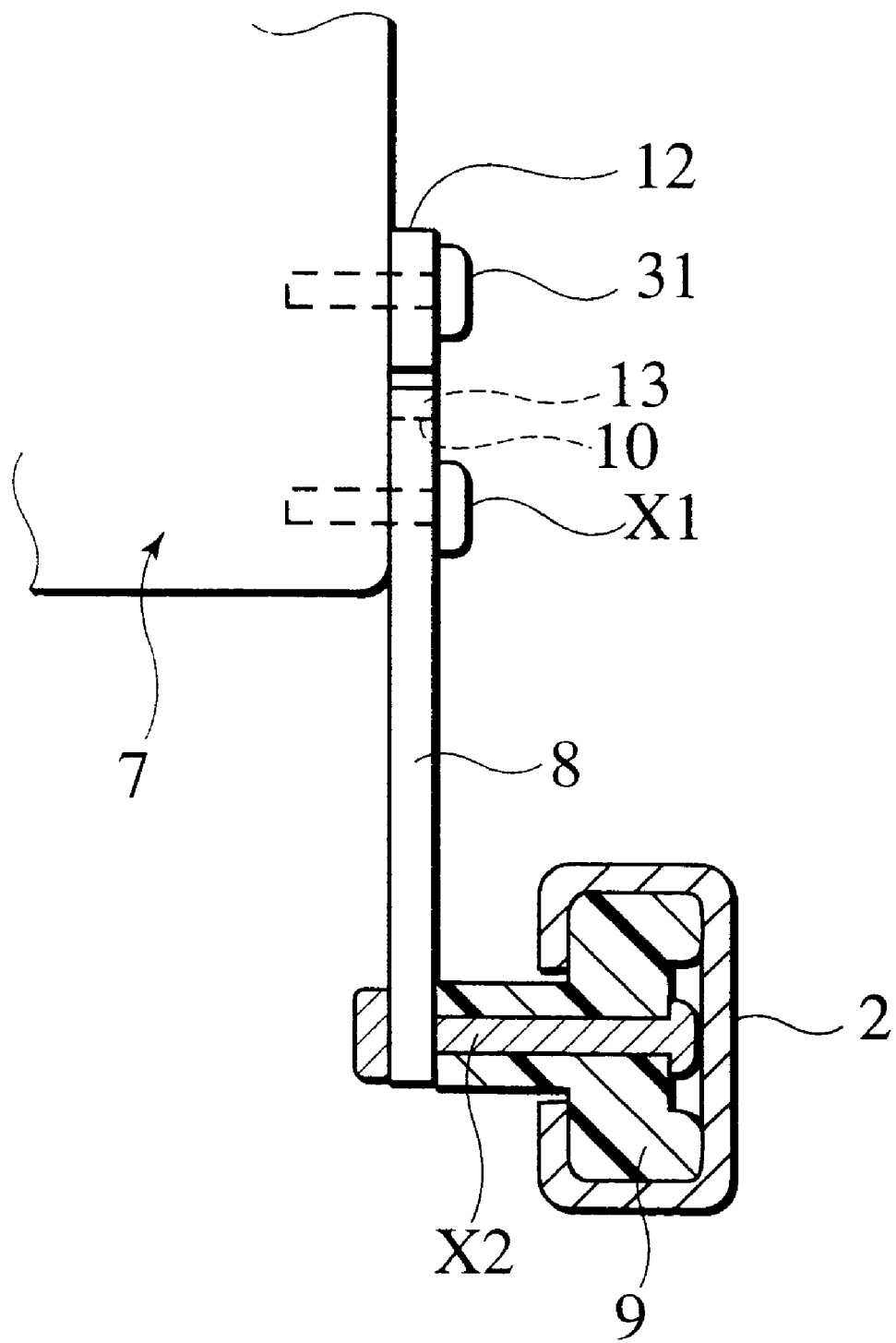
FIG. 6 is a sectional view taken along SA-SA line shown by arrows in FIG. 1.

A preferred embodiment of the present invention will be described below on the basis of the drawing. This embodiment shows a flattening structure of a third seat 1 in the third row in a wagon. The third seat 1 is supported by slide rails 2 as a guide member. The slide rails 2 are fixed to a floor 4 by front and rear leg parts 3. The pair of left and right slide rails 2 are provided and each of the slide rails 2 has a C shape in section (see FIG. 6), the C shape having an opening and a hollow guide part along a longitudinal direction at an inner side face of the slide rail 2. At the rear of the slide rails 2, a luggage room R is formed.

At a front side part of the slide rails 2, a bracket 5 as "a peripheral member" is formed to stand on the floor 4. The bracket 5 is rectangular when viewed from a side and is joined to inner sides of the slide rails 2 though it is not shown in the drawings. Therefore, by joining the bracket 5, assembled stiffness of the slide rails 2 is improved.

The third seat 1 is formed of a seat cushion 6 and a seat back 7. A front-end part 6b of the seat cushion 6 is axially supported on a front-end fulcrum S1 set on a front end of an upper part of the bracket 5. A rear end part 6a of the seat cushion 6 is placed on a support (not shown) such that a normal usage state in which a surface is oriented upward is maintained reliably. By lifting the rear end part 6a of the seat cushion 6 and pivoting the entire seat cushion 6 forward on the front end fulcrum S1, a reversed state in which a back face of the seat cushion 6 is oriented upward is obtained. This reversed state is also supported by the support (not shown). Since the seat cushion 6 is simply pivoted forward on the front-end fulcrum S1 as a reversing structure of the seat cushion 6, the structure is simple and reversing operation is easy. In this reversed state of the seat cushion 6, it is possible to incline the back face forward through a predetermined angle by adjusting the support (not shown). This adjustment is for preventing interference of the seat cushion 6 of the third seat with a seat back of a second seat as a seat in front of the third seat (not shown) when the seat back of the second seat is in a reclining state.

Figure 5:
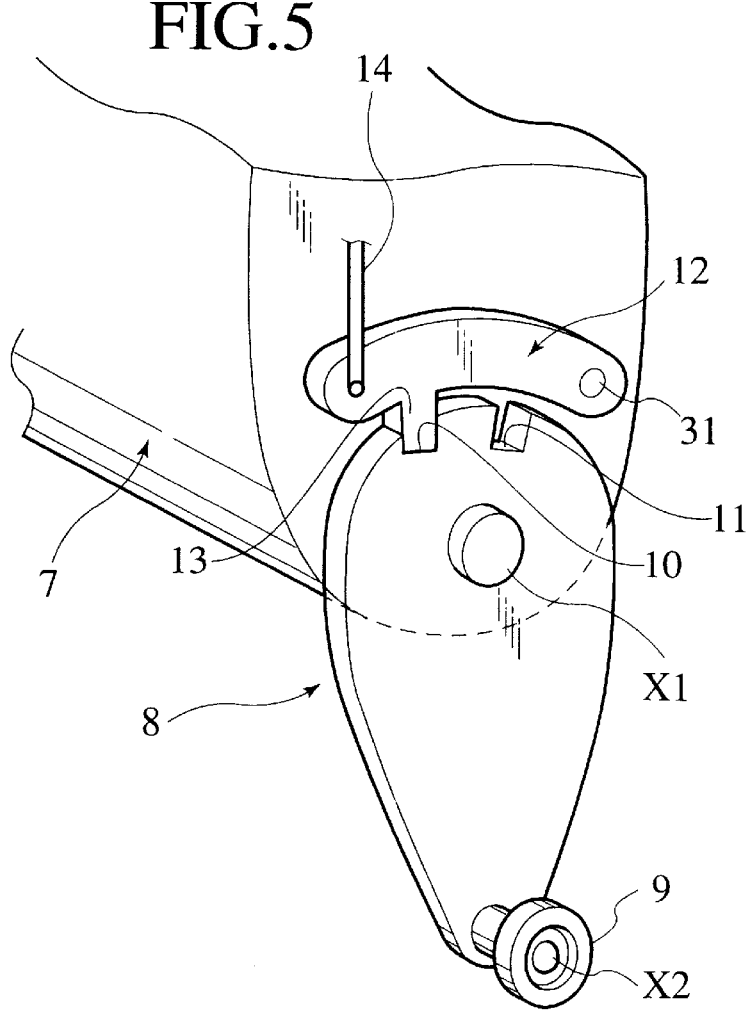
FIG. 5 is a enlarged perspective view which shows an arm and a stopper.

On the other hand, an upper part of a plate-shaped arm 8 is mounted to a side face of a lower end of the seat back 7 such that the arm 8 can rotate about a pivot fulcrum X1. To a lower end of the arm 8, a pivot fulcrum X2 as a second fulcrum is provided. A roller 9 as a rotating member projecting outward in a width direction of a vehicle is provided to the pivot fulcrum X2 and the roller 9 is engaged with the slide rail 2 such that the roller 9 can slide forward and rearward. An upper edge of the arm 8 is formed into an arc shape and a first notch 10 and a second notch 11 is formed clockwise at the upper edge as shown in FIG. 5.

A similar plate-shaped stopper 12 is mounted to the side face of the lower end 7a of the seat back 7 and above the arm 8 such that the stopper 12 can pivot on a pin 31 at a rear end of the stopper 12. At a front end of the stopper 12, a projection 13 that can be engaged or latched with the first notch 10 and the second notch 11 is formed. The projection 13 of the stopper 12 is engaged with the first notch 10 in the normal usage state of the seat back 7 and with the second notch 11 in a position slightly displaced from the normal usage state toward the reclining state.

Figure 4:
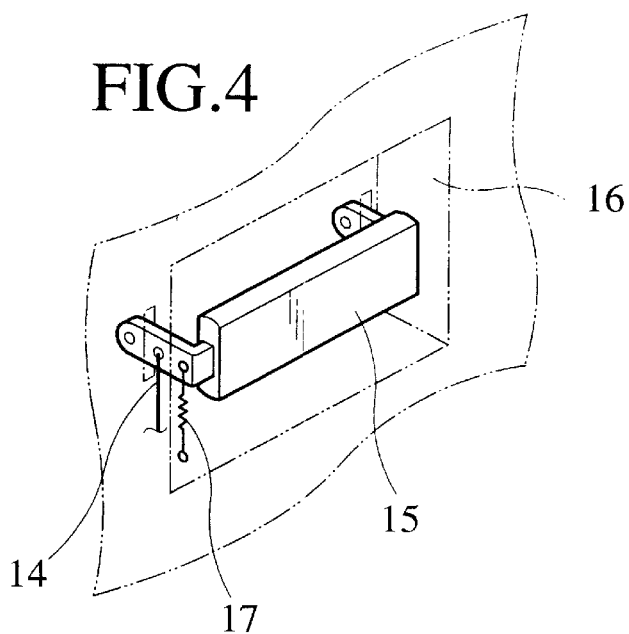
FIG. 4 is a perspective view which shows a releasing operating part.

To the front end of the stopper 12, a lower end of a wire 14 is connected. The wire 14 is connected to a releasing lever 15 as "a releasing operating part" provided to a back face of an upper part of the seat back 7. The releasing lever 15 is rotatable upward and downward or clockwise and counterclockwise within a recessed portion 16 formed on the back face and is biased downward by a spring 17 shown in FIG. 4. Therefore, this biasing force pushes down the wire 14 and the projection 13 of the stopper 12 is biased constantly in an engagement direction. If the releasing lever 15 is rotated upward by resisting the spring 17, the wire 14 is pulled upward and engagement of the projection 13 of the spring 17 and the first and second notches 10 and 11 with each other is released.

Next, an intermediate fulcrum S2 is set at an intermediate part of the seat back 7 and the intermediate fulcrum S2 and the bracket 5 are connected through a back link 18. Since an end part of the back link 18 is axially supported on a fulcrum S3 on the bracket 5 separated from the slide rails 2, it is unnecessary to apply processing to the slide rails 2 for enabling the slide rails 2 to axially support the end parts. Therefore, production of the slide rails 2 is facilitated and reduction of stiffness of the slide rails 2 can be prevented.

To a rear part of the bracket 5, a lock plate 20 as "a lock mechanism or a lock member" pivotable on a pin 19 is mounted. Between the lock plate 20 and the bracket 5, a spring 21 is provided for pivoting and biasing a rear end of the lock plate 20 downward, i.e., clockwise. The rear end of the lock plate 20 is engaged or latched from an upper side with the roller 9 provided to the lower end of the arm 8. To a lower end of the lock plate 20, a lock releasing wire 22 is connected.

Next, respective forms of the third seat 1 according to this embodiment will be described in order.

Figure 1:
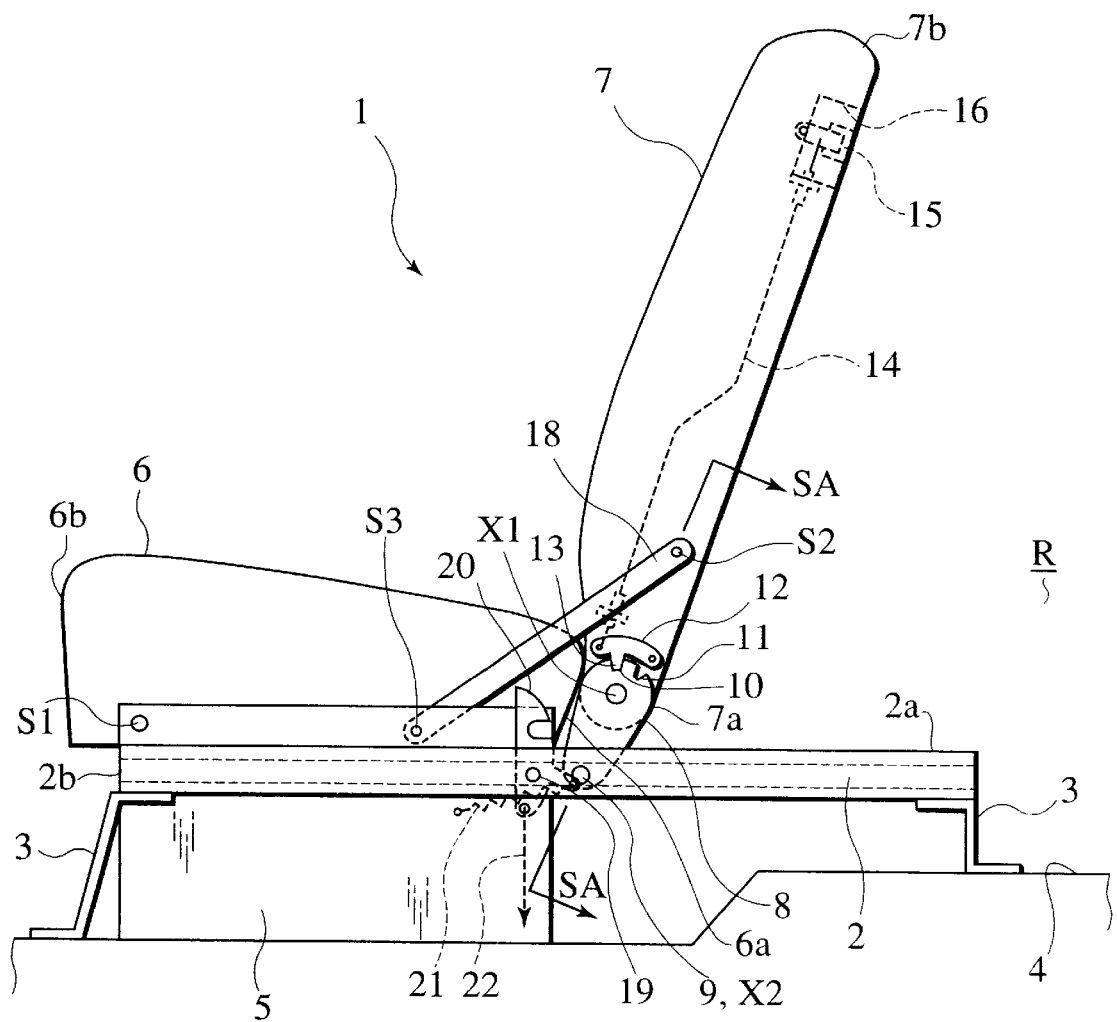
FIG. 1 is a side view which shows normal usage state of a third seat according to an embodiment of the invention.

First, the normal usage state will be described based on FIG. 1.

If the projection 13 of the stopper 12 is latched with the first notch 10 of the arm 8 to integrate the seat back 7 and the arm 8 to be fixed with each other and the roller 9 at the lower end 7a of the seat back 7 is latched with the lock plate 20 to be locked with each other, the seat back 7 is brought into the normal usage state in which the seat back 7 is standing with a predetermined angle. In the normal usage state in which the surface of the seat cushion 6 is oriented upward, a passenger can sit on the seat 1 in a normal posture.

Figure 2:
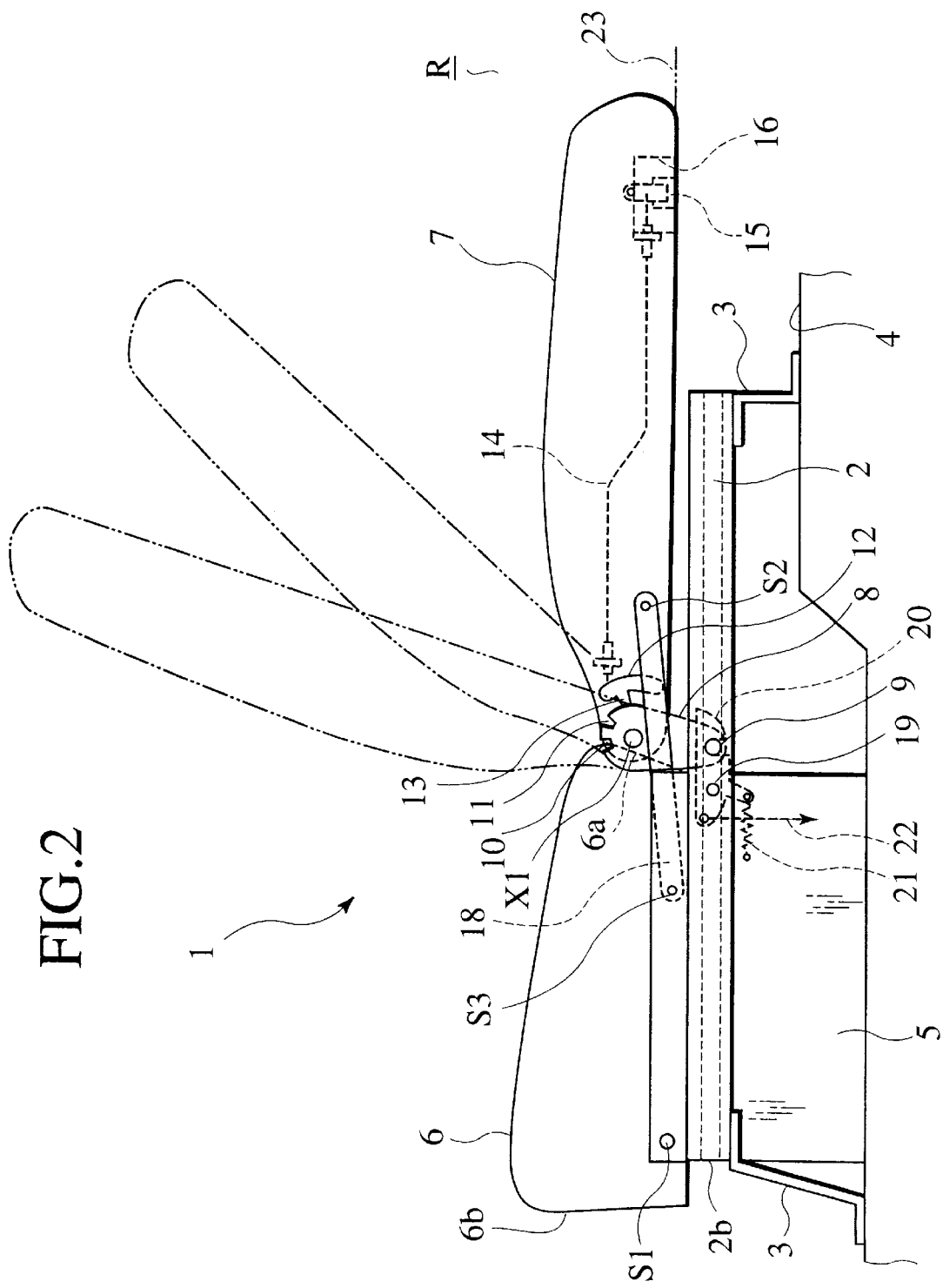
FIG. 2 is a side view which shows a reclining state.

Next, the reclining state will be described based on FIG. 2.

If the releasing lever 15 provided to the back face of the upper part of the seat back 7 is rotated upward, i.e., counterclockwise, the projection 13 of the stopper 12 is detached from the first notch 10. The seat back 7 becomes pivotable rearward about the fulcrum X1. If the seat back 7 is pulled rearward, the seat back 7 pivots clockwise on the fulcrum X1. The back link 18 follows the seat back 7 and pivots clockwise on the fulcrum S3. At this time, in rotating the releasing lever 15, a hand of a passenger supports the upper part 7b of the seat back 7 from a back side. Therefore, the seat back 7 does not fall down rearward with great force under its own weight and it is possible to slowly bring the seat back 7 into the horizontal reclining state while supporting the seat back 7 with the hand.

The upper part 7b of the seat back 7 in the horizontal reclining state is supported by a support 23 (see FIG. 2) at a rear part of the vehicle. Therefore, load is not applied to the arm 8 and the stopper 12 in the reclining state. Moreover, because the second notch 11 is formed in the position displaced from the first notch 10 toward the reclining state, the projection 13 of the stopper 12 is latched with the second notch 11 to prevent the seat back 7 from falling down to the reclining position with great force if the hand is taken off from the releasing lever 15 immediately after operation of the releasing lever 15 and before the reclining state is obtained. In other words, the second notch 11 functions as a safety device.

Figure 3:
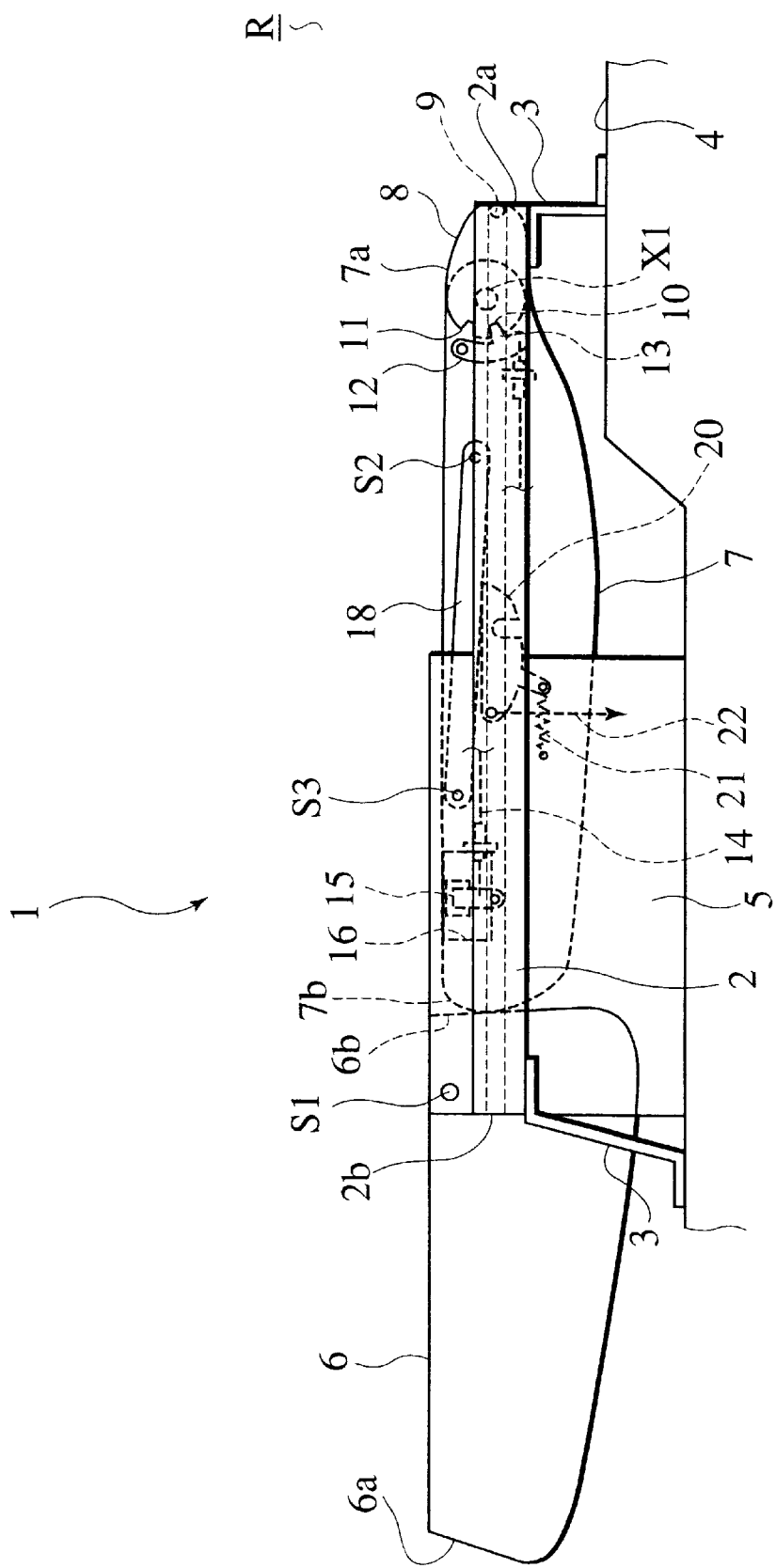
FIG. 3 is a side view which shows a reversed state of a seat cushion and a seat back.

Next, the reversed state will be described based on FIG. 3.

First, the seat cushion 6 is pivoted forward on the front-end fulcrum S1, thus to be brought into the horizontal reversed state. Then, the lock releasing wire 22 is pulled to release engagement of the lock plate 20 and the roller 9 with each other. If the seat back 7 is pushed forward, the roller 9 moves rearward along the rail 2 while the seat back 7 is pivoted counterclockwise on the roller 9, or the fulcrum X2. At this time, the back link 18 pivots clockwise on the fulcrum S3.

If the roller 9 is moved rearward to a rear end position 2a of the slide rail 2, the seat back 7 is brought into the horizontal reversed state and the seat back 7 and the back link 18 are horizontally aligned with each other. Thus, the back face of the seat back 7 has substantially the same height as the back face of the seat cushion 6, that is, an end 7b of the seat back 7 is flush with an end 6b of the seat cushion 6.

The passenger can be lying down straight on the third seat 1 similarly to the reclining state. Otherwise, since the luggage room R is widened, it is possible to load more pieces of luggage into the luggage room.

While preferred embodiments of the present invention have been described using specific terms, such description is for illustrative purposes, and it is to be understood that changes and variations may be made without departing from the spirit or scope of the following claims.

What is claimed is:

1. A flattening seat structure for a vehicle comprising:
   a seat cushion to pivot to be in a horizontal reversed state, the seat cushion having a back side;
   a seat back to pivot to be in a horizontal reversed state, the seat back having a reverse side, the reverse side in the horizontal reversed state having a height substantially equal to one of the back side of the seat cushion in the horizontal reversed state;
   an arm attached to a lower end of the seat back, the arm supporting the lower end of the seat back to be rotated;
   a roller fixed to a lower end of the arm, the roller projecting outward in a transverse direction of a vehicle body;
   a slide rail fixed to a floor, the slide rail engaging with the roller to be slid forward and rearward;
   a lock mechanism detachably engaging with the roller;
   a back link connected to an intermediate fulcrum of the seat back above the roller, the back link connected to one of an intermediate portion of the slide rail and a peripheral member around the portion;
   a stopper provided at the lower end of the seat back, the stopper engaging with the arm for preventing the arm from rotating; and
   an operating means for releasing engagement with the stopper and the arm, the operating means being provided at an upper part of the seat back,
      wherein the seat back pivots forward to be in a horizontal reversed state when releasing the lock mechanism and sliding the roller of the seatback rearward,
      the seat back pivots on the lower end thereof to fall down rearward for a reclining state when releasing engagement with the stopper and the arm.

2. A flattening seat structure for a vehicle according to claim 1,
   wherein the operating means is at the upper part of the seat back and at the reverse side of the seat back.

3. A flattening seat structure for a vehicle according to claim 1,
   wherein an upper edge of the arm has an arc shape and is formed with a first notch and a second notch, an end of the stopper is supported by the seat back and another end thereof is formed with a projection directed toward the arm, the projection engages with the first notch in normal usage state of the seat back, and the projection engages with the second notch in a position slightly displaced from the normal usage state toward the reclining state.

4. A flattening seat structure for a vehicle according to claim 1,
   wherein the seat cushion in a normal usage state pivots forward on a front-end fulcrum thereof to be in a horizontal reversed state.

5. A flattening seat structure for a vehicle according to claim 1,
   wherein the peripheral member is a bracket standing in the vicinity of the slide rail, and the bracket supports an end part of the back link to be pivoted thereon.

6. A seat for a vehicle comprising:

a seat back;

a guide guiding seat back;

a link linked between the seat back and the guide;

and a recliner disposed between the link and guide, the recliner being supported slidably and rotatably by the guide, the recliner supporting rotatably the seat back.

7. A seat for a vehicle according to claim 6, wherein the recliner has a slider engaging with the guide.

8. A seat for a vehicle according to claim 7, wherein the guide has a lock member supported rotatably thereby, the lock member latching with the slider to fix the seat back relative to the guide.

9. A seat for a vehicle according to claim 8, wherein the recliner has a stopper rotatably supported by the seat back and detachably engaging therewith.

* * * * *